(12) United States Patent
Xu et al.

(10) Patent No.: US 10,600,415 B2
(45) Date of Patent: Mar. 24, 2020

(54) METHOD, APPARATUS, DEVICE, AND STORAGE MEDIUM FOR VOICE INTERACTION

(71) Applicant: Baidu Online Network Technology (Beijing) Co., Ltd., Beijing (CN)

(72) Inventors: Jianan Xu, Beijing (CN); Guoguo Chen, Beijing (CN); Qinggeng Qian, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/133,336

(22) Filed: Sep. 17, 2018

(65) Prior Publication Data

US 2019/0198019 A1    Jun. 27, 2019

(30) Foreign Application Priority Data

Dec. 26, 2017    (CN) .......................... 2017 1 1427997

(51) Int. Cl.
| | |
|---|---|
| *G10L 15/22* | (2006.01) |
| *G10L 15/18* | (2013.01) |
| *G10L 17/22* | (2013.01) |
| *G10L 17/04* | (2013.01) |

(52) U.S. Cl.
CPC .......... *G10L 15/22* (2013.01); *G10L 15/1815* (2013.01); *G10L 17/04* (2013.01); *G10L 17/22* (2013.01); *G10L 2015/223* (2013.01); *G10L 2015/225* (2013.01); *G10L 2015/228* (2013.01)

(58) Field of Classification Search
CPC ............................ G10L 15/1815; G10L 15/22
USPC .......................................................... 703/231
See application file for complete search history.

(56) References Cited

U.S. PATENT DOCUMENTS 10,051,600 B1 *    8/2018    Zhong .................... H04L 67/12
2012/0096481 A1    4/2012    Sano

FOREIGN PATENT DOCUMENTS

| CN | 103561156 A | 2/2014 |
|---|---|---|
| CN | 105739977 A | 7/2016 |
| CN | 107360327 A | 11/2017 |
| JP | 2003195891 A | 7/2003 |
| JP | 2004289710 A | 10/2004 |

\* cited by examiner

*Primary Examiner* — Bharatkumar S Shah
(74) *Attorney, Agent, or Firm* — Knobbe, Martens, Olson & Bear, LLP

(57) ABSTRACT

This disclosure provides a method, apparatus, device, and storage medium for voice interaction, where the method is applied to an AI device to determine whether a current scenario of the AI device is a preset scenario and waken a voice interaction function of the AI device to facilitate voice interaction with a user in response to the current scenario of the AI device being the preset scenario. A scenario directly triggers the voice interaction process, thereby avoiding the process of wakening by physical wakening or a wakening word, simplifying the process of using voice interaction, reducing the costs of learning voice interaction, and improving user experience.

18 Claims, 5 Drawing Sheets

METHOD, APPARATUS, DEVICE, AND STORAGE MEDIUM FOR VOICE INTERACTION

CROSS-REFERENCE TO RELATED APPLICATIONS

This application claims priority to Chinese Patent Application No. 201711427997.9, filed with the China National Intellectual Property Administration (CNIPA) on Dec. 26, 2017, the content of which is incorporated herein by reference in its entirety

TECHNICAL FIELD

Embodiments of the disclosure relate to the field of artificial intelligence (AI) technology, and in particular to a method, apparatus, device, and storage medium for voice interaction.

BACKGROUND

With the continuous development of intelligent terminal devices, there are increasing devices capable of voice interaction, and increasing applications of voice interaction in users' daily life. Constant attention is being paid to the product design around how to improve the product usability.

At present, the common voice interaction process includes: first: a user clicks a control button or a home button on a terminal device to start a voice interaction process, the user says a desired operation, and the terminal device collects the voice data of the user and the voice interaction with the device is implemented. Second: starting a voice interaction process using a constant wakening word. A user needs to first know the wakening word for voice interaction with the terminal device, and then the user says the wakening Word, the terminal device starts the voice interaction process based on the collected constant wakening word, and after starting the voice interaction process the terminal device collects voice data of the user for voice interaction. For example, a user says "small robot, small robot" to waken the voice interaction function of his mobile phone. Third: implementing voice interaction using oneshot technology. The voice interaction is started using a wakening word with the addition of a desired operation, i.e., the user says a constant wakening word and a desired content to be executed by the terminal device. The terminal device starts a voice interaction process based on the wakening word, and directly performs voice interaction based on the collected content expected by the user to be executed by the terminal device. For example, a user says "small robot, small robot, how's the weather like today" for starting voice interaction with his mobile phone.

In the above voice interaction solutions, during the voice interaction, the user needs to enable the terminal device to start the voice interaction function by using physical wakening, such as a control button, a home key, or the like, or by saying the constant wakening word. Wakening by the wakening word has some errors, resulting in a complex use process and a low success rate of the current voice interaction, and resulting in a low frequency of using the voice interaction by users.

SUMMARY

Embodiments of the disclosure provide a method, apparatus, device, and storage medium for voice interaction, for solving problems of the complex use process and the low success rate of the voice interaction, and the low frequency of using the voice interaction by users in the above voice interaction solutions.

A first aspect of the disclosure provides a method for voice interaction, comprising:
  determining whether a current scenario of the AI device is a preset scenario; and
  wakening a voice interaction function of the AI device to facilitate voice interaction with a user, in response to the current scenario of the AI device being the preset scenario.

In a specific implementation, the determining whether a current scenario of the AI device is a preset scenario includes:
  detecting whether the operation state of the AI device is changed; and
  determining, in response to the operation state of the AI device being changed, whether a scenario of the AI device is the preset scenario after the operation state is changed.

In a specific implementation, the determining whether a current scenario of the AI device is a preset scenario includes:
  receiving a scenario setting instruction entered by a user on the AI device; and
  determining whether the current scenario of the AI device is the preset scenario based on the scenario setting instruction.

In a specific implementation, the determining whether a current scenario of the AI device is a preset scenario includes:
  periodically detecting and determining whether the current scenario of the AI device is the preset scenario based on a preset period.

In a specific implementation, the determining whether a current scenario of the AI device is a preset scenario includes:
  detecting whether a microphone of the AI device is in an on-state; and
  determining the current scenario of the AI device is the preset scenario in response to the microphone being in the on-state.

In a specific implementation, the preset scenario includes a calling scenario, and the determining whether a current scenario of the AI device is a preset scenario includes:
  detecting whether the AI device is in a calling process or receives a request for calling; and
  determining the current scenario of the AI device is the preset scenario in response to the AI device being in the calling process or receiving the request for calling.

In a specific implementation, the preset scenario includes a media file playing scenario, and the determining whether a current scenario of the AI device is a preset scenario includes:
  detecting whether the AI device is playing a media file, the media file including at least one of an image file, an audio file, or a video file; and
  determining the current scenario of the AI device is the preset scenario in response to the AI device being playing the media file.

In a specific implementation, the preset scenario includes a mobile scenario, and the determining whether a current scenario of the AI device is a preset scenario includes:
  detecting a moving speed of the AI device, and determining whether the moving speed is greater than a preset value; and determining the current scenario of the AI device is the preset scenario in response to the moving speed being greater than the preset value.

Optionally, the preset scenario includes a messaging scenario, and the determining whether a current scenario of the AI device is a preset scenario includes:

detecting whether the AI device receives a short message or a notification message; and determining the current scenario of the AI device is the preset scenario in response to the AI device receiving the short message or the notification message.

Optionally, the wakening a voice interaction function of the AI device to facilitate voice interaction with a user includes:

acquiring voice data of the user; and performing voice interaction based on the voice data and a preset instruction set corresponding to the current scenario of the AI device.

Optionally, the acquiring voice data of the user includes:

controlling the microphone of the AI device to collect the voice data of the user;

or, controlling a bluetooth or a headset microphone connected to the AI device to collect a voice of the user and acquire the voice data of the user;

or, receiving the voice data of the user sent by other device.

Furthermore, the method further includes:

identifying and understanding the voice data using an acoustic model and a semantic understanding model to obtain a semantic understanding result; and executing an operation indicated by the semantic understanding result when a confidence level of the semantic understanding result is greater than a preset threshold.

Optionally, before the identifying and understanding the voice data using an acoustic model and a semantic understanding model, the method further includes:

processing the voice data by noise cancellation and echo cancellation.

Optionally, the identifying and understanding the voice data using an acoustic model and a semantic understanding model to obtain a semantic understanding result includes:

matching the voice data using the acoustic model to identify semantic data; and understanding and analyzing the semantic data based on the semantic understanding model to obtain the semantic understanding result.

Optionally, the method further includes:

evaluating the confidence level of the semantic understanding result based on the current scenario of the AI device, the instruction set corresponding to the current scenario of the AI device, and a state of the AI device;

determining whether the confidence level of the semantic understanding result is greater than the preset threshold; and discarding the executing an operation indicated by the semantic understanding result when the confidence level of the semantic understanding result is smaller than the preset threshold.

Optionally, the executing the operation indicated by the semantic understanding result includes:

outputting the semantic understanding result to a software interface for execution through a specified instruction.

A second aspect of the disclosure provides an apparatus for voice interaction, including:

a first processing module, for determining whether a current scenario of an apparatus for voice interaction is a preset scenario; and a second processing module, for wakening a voice interaction function of the apparatus for voice interaction to facilitate voice interaction with a user, in response to the current scenario of the apparatus for voice interaction being the preset scenario.

Optionally, the first processing module is specifically used for:

detecting whether the operation state of the apparatus for voice interaction is changed; and determining, in response to the operation state of the apparatus for voice interaction being changed, whether a scenario of the apparatus for voice interaction is the preset scenario after the operation state is changed.

Optionally, the first processing module is specifically used for:

receiving a scenario setting instruction entered by a user on the apparatus for voice interaction; and determining whether the current scenario of the apparatus for voice interaction is the preset scenario based on the scenario setting instruction.

Optionally, the first processing module is specifically used for:

periodically detecting and determining whether the current scenario of the apparatus for voice interaction is the preset scenario based on a preset period.

Optionally, the first processing module is specifically used for:

detecting whether a microphone of the apparatus for voice interaction is in an on-state; and determining whether the current scenario of the apparatus for voice interaction is the preset scenario in response to the microphone being in the on-state.

Optionally, the preset scenario includes a calling scenario, and the first processing module is further used for:

detecting whether the apparatus for voice interaction is in a calling process or receives a request for calling; and determining the current scenario of the apparatus for voice interaction is the preset scenario in response to the apparatus for voice interaction being in the calling process or receives the request for calling.

Optionally, the preset scenario includes a media file playing scenario, and the first processing module is further used for:

detecting whether the apparatus for voice interaction is playing a media file, the media file including at least one of an image file, an audio file, or a video file; and determining the current scenario of the apparatus for voice interaction is the preset scenario in response to the apparatus for voice interaction being playing the media file.

Optionally, the preset scenario includes a mobile scenario, and the first processing module is further used for:

detecting a moving speed of the apparatus for voice interaction, and determining whether the moving speed is greater than a preset value; and determining the current scenario of the apparatus for voice interaction is the preset scenario in response to the moving speed being greater than the preset value.

Optionally, the preset scenario includes a messaging scenario, and the first processing module is further used for:

detecting whether the apparatus for voice interaction receives a short message or a notification message; and determining the current scenario of the apparatus for voice interaction is the preset scenario in response to the apparatus for voice interaction receiving the short message or the notification message.

Optionally, the second processing module is specifically used for:
  acquiring voice data of the user; and
  performing voice interaction based on the voice data and a preset instruction set corresponding to the current scenario of the apparatus for voice interaction.

Optionally, the second processing module is further used for:
  controlling the microphone of the apparatus for voice interaction to collect the voice data of the user;
  or,
  controlling a bluetooth or a headset microphone connected to the apparatus for voice interaction to collect a voice of the user and acquire the voice data of the user;
  or,
  receiving the voice data of the user sent by other device.

Optionally, the apparatus further includes:
  a third processing module, for identifying and understanding the voice data using an acoustic model and a semantic understanding model to obtain a semantic understanding result; and
  a fourth processing module, for executing an operation indicated by the semantic understanding result when a confidence level of the semantic understanding result is greater than a preset threshold.

Optionally, before the identifying and understanding the voice data using an acoustic model and a semantic understanding model, the third processing module is further used for processing the voice data by noise cancellation and echo cancellation.

Optionally, the third processing module is specifically used for:
  matching the voice data using the acoustic model to identify semantic data; and
  understanding and analyzing the semantic data based on the semantic understanding model to obtain the semantic understanding result.

Optionally, the fourth processing module is specifically used for:
  evaluating the confidence level of the semantic understanding result based on the current scenario of the apparatus for voice interaction, the instruction set corresponding to the current scenario of the apparatus for voice interaction, and a state of the apparatus for voice interaction;
  determining whether the confidence level of the semantic understanding result is greater than the preset threshold; and
  discarding the executing an operation indicated by the semantic understanding result when the confidence level of the semantic understanding result is smaller than the preset threshold.

Optionally, the fourth processing module is further used for:
  outputting the semantic understanding result to a software interface for execution through a specified instruction.

A third aspect of the disclosure provides an AI device, including: a memory and a processor;
where the memory is used for storing computer instructions; and the processor is used for running the computer instructions stored in the memory to implement the method for voice interaction according to any one of the implementations in the first aspect.

A fourth aspect of the disclosure provides a storage medium, including: a readable storage medium and computer instructions, where the computer instructions are stored in the readable storage medium; and the computer instructions are used for implementing the method for voice interaction according to any one of the implementations in the first aspect.

A fifth aspect of embodiments of the disclosure provides a program product, the program product includes computer instructions (i.e., computer programs), and the computer instructions are stored in a readable storage medium. At least one processor of the AI device can read the computer instructions from the readable storage medium, and at least one processor executes the computer instructions to enable the AI device to implement the method for voice interaction according to any one of the implementations in the first aspect.

The method, apparatus, device, and storage medium for voice interaction according to embodiments of the disclosure determine whether a current scenario of the AI device is a preset scenario, and waken a voice interaction function of the AI device to facilitate voice interaction with a user, in response to the current scenario of the AI device being the preset scenario. A scenario of the AI device directly triggers the voice interaction process, thereby avoiding the process of wakening by physical wakening or a wakening word, simplifying the process of using voice interaction, reducing the costs of learning voice interaction, improving user experience, and reducing the technology development costs without the need of the process of wakening by special voice interaction wakening hardware or a wakening word.

BRIEF DESCRIPTION OF THE DRAWINGS

To more clearly describe the technical solution of the embodiments of this disclosure or the existing technologies, the accompany drawings to be used in the description of the embodiments or the existing technologies will be briefly introduced below. Apparently, the accompanying drawings described below are some embodiments of the disclosure. For those skilled in the art, other drawings may also be obtained based on these drawings without inventive efforts.

DETAILED DESCRIPTION OF EMBODIMENTS

To make the objectives, the technical solution and the advantages of the embodiments of this disclosure clearer, the technical solution of the embodiments of the disclosure will be clearly and completely described hereinafter with reference to the accompanying drawings in the embodiments of this disclosure. Apparently, the embodiments described below are a part, instead of all, of the embodiments of the disclosure. Based on the embodiments of this disclosure, all other embodiments obtained by those skilled in the art without inventive efforts fall within the scope of protection of this disclosure.

With the increasing scenarios and devices applying voice interaction, constant attention is being paid to the product design around how to improve the product usability. At present, the solution of wakening a voice interaction process by using a physical button or by saying a constant wakening word by a user has following problems:

(1) wakening by either of the physical wakening or the wakening word needs to continuously guide users, but the actual use frequency is still very low, thereby resulting in high user education costs.

(2) meeting the user needs to go through 2 or 3 steps and always is blocked by a wakening operation and, and there in influences on the success rate (successful wakening and successful need identification), resulting in a complex use process.

(3) either the physical button or wakening word requires not only costs of meeting the user needs, but also additional research and development costs and time costs, resulting in high technology development costs.

Based on the above existing problems, some embodiments of this disclosure provide a method for voice interaction. By directly performing a voice interaction process in a specific scenario, i.e., scenario triggering, a user may directly say a relevant operation instruction to a terminal device in a preset scenario, and the terminal device can avoid a wakening process, and directly identify and execute the relevant operation instruction said by the user, thereby realizing more convenient voice interaction, simplifying the process, and improving user experience, whilst reducing the technology development costs.

The method for voice interaction according to embodiments of this disclosure may be applied to all artificial intelligence (AI) devices, such as mobile phones, computers, tablet computers, wearable devices, robots, smart appliances, servers, and other terminal devices, industrial production equipment, medical equipment, and security and protection equipment, which are not limited in this solution.

Figure 1:
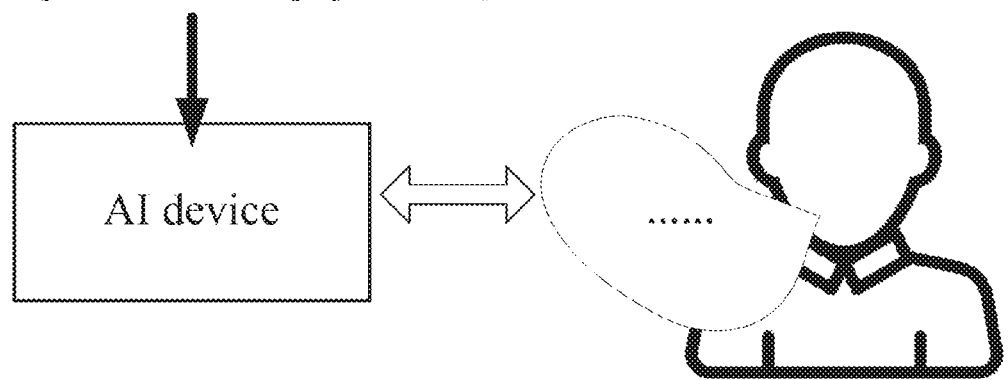
FIG. 1 is a schematic diagram of conception of a method for voice interaction according to an embodiment of the present disclosure.

FIG. 1 is a schematic diagram of conception of a method for voice interaction according to an embodiment of the disclosure. As shown in FIG. 1, the main conception of this solution is: presetting one or more preset scenarios in an AI device, when the AI device determines whether it is in any one of the preset scenarios thereof, it wakens a voice interaction function, collects the voice data of a user, and completes the voice interaction process with the user. The preset scenarios may be set before the AI device leaves factory, or be manually set by the user based on his own needs in the use process.

The method for voice interaction is illustrated below in conjunction with specific embodiments.

Figure 2:
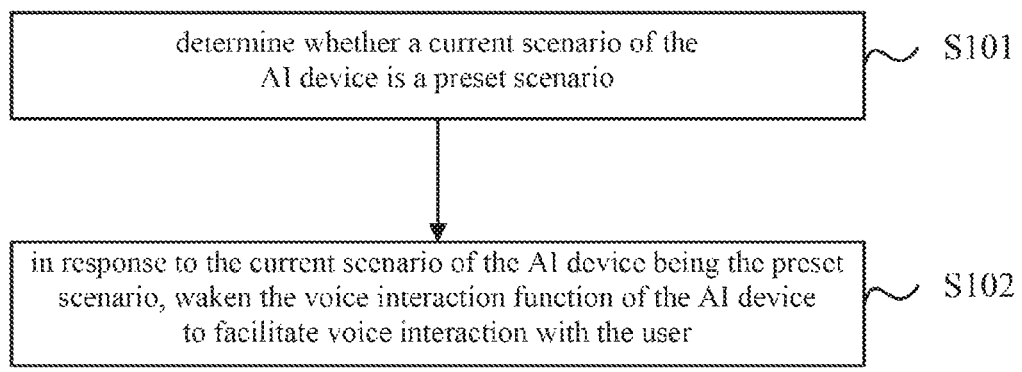
FIG. 2 is a flow chart of a method for voice interaction according to the first embodiment of the present disclosure.

FIG. 2 is a flow chart of a method for voice interaction according to a first embodiment of this disclosure. As shown in FIG. 2, the method for voice interaction according to this embodiment specifically includes:

S101: determining whether a current scenario of the AI device is a preset scenario.

In this step, one or more preset scenarios are set in the AI device, the AI device determines whether it is in any one of the preset scenarios thereof, and then determines whether to perform voice interaction with the user. If the AI device is not in the preset scenarios, the voice interaction function is not wakened.

Figure 3:
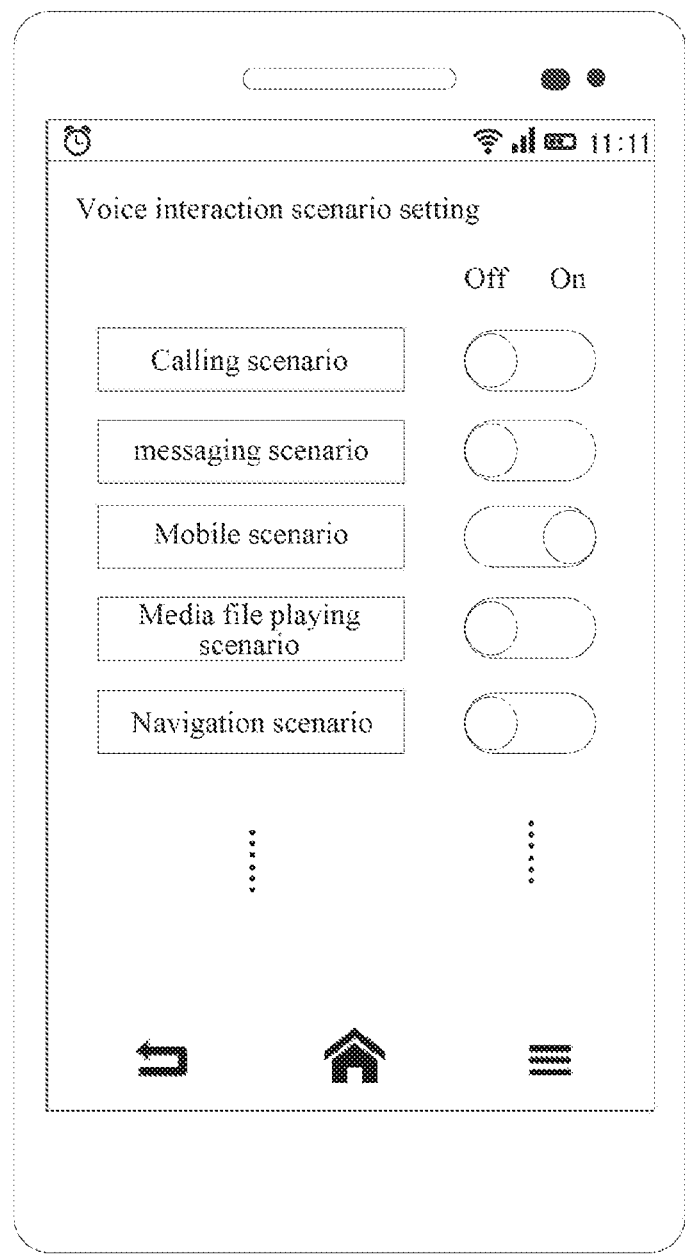
FIG. 3 is a schematic diagram of preset scenario setting in a method for voice interaction according to an embodiment of the present disclosure.

The preset scenarios may be configured before the AI device leaves factory, or set based on a user's operation in an applying process, which is not limited in this solution. For example, FIG. 3 is a schematic diagram of preset scenario setting in a method for voice interaction according to an embodiment of this disclosure. As shown in FIG. 3, the AI device setting can provide an interface for setting a voice interaction scenario, and provide a plurality of interfaces for users to choose therefrom. In the figure, on the interface for setting voice interaction scenarios, a plurality of common scenarios are provided, and switch operations are correspondingly provided, a user can choose scenarios in which voice interaction is automatically performed based on the actual situation. For example, in the figure, the user selects a mobile scenario, and then the AI device will automatically execute the voice interaction process in the mobile scenario.

The preset scenario can be an environment of the AI device or a scenario of a state of the AI device. For example, taking a mobile phone as an example, the preset scenarios include: a calling scenario, including a user being in a calling process, receiving an incoming call, or the like; a media file playing scenario, including a mobile phone being playing a video, an audio, an image, or the like; a messaging scenario, including a mobile phone receiving a short message or receiving a notification message from an application program, or the like; an alarm clock scenario; a photographing scenario, including a mobile phone being taking a photo or recording a video, or the like; a mobile scenario, including a mobile phone being in a vehicle mounting state, or a navigation state, or the user being running or walking, or the like; and a charging scenario.

In a specific implementation of this step, the AI device may determine whether it is in a preset scenario based on its own state change, a user's operation, a period, a microphone state of the AI device, or the like. The specific method of determining whether the AI device is in a preset scenario at least includes:

first, detecting whether the operation state of the AI device is changed; and determining, if the operation state of the AI device is changed, whether a scenario of the AI device is the preset scenario after the operation state is changed.

In the solution, the AI device triggers the process of determining whether it is in a preset scenario by an operation state change. The operation state here includes not only a change of the AI device caused by a user operation, but also a state change of the AI device. For example, a mobile phone is still taken as an example, the mobile phone receives an incoming call in standby time, at this time the mobile phone state is changed, and then whether the scenario of continuing the incoming call by answering the call, or rejecting the call is a preset scenario after the state of the mobile phone is changed may be determined. Alternatively, when a mobile phone receives a short message, or a notice from an application program, the state of the mobile phone is changed at this time, and then whether the receiving a message is a preset scenario after the state change may be detected. Alternatively, when a user unlocks a mobile phone, the mobile phone changes from a standby blank screen state into an operable state of screen-on, the mobile phone state is changed at this time, and then whether the mobile phone is in a preset scenario after the state change may be determined.

Second: receiving a scenario setting instruction entered by a user on the AI device, and determining whether the current scenario of the AI device is a preset scenario based on the scenario setting instruction.

In the solution, a user operates on the AI device, i.e., entering a scenario setting instruction, which will trigger the AI device to determine whether the current scenario is a preset scenario. For example, a user opens map software in his mobile phone to start a navigation function, then the mobile phone enters a navigation scenario, and whether the navigation scenario of the mobile phone is a preset scenario may be determined. Alternatively, when a user enters a phone number and dial the phone number, the mobile phone begins to make a call, and is in a calling scenario. Whether the calling scenario is a preset scenario may be determined.

Third: periodically detecting and determining whether the current scenario of the AI device is the preset scenario based on a preset period.

In the solution, a preset period of determining whether the scenario of the AI device is the preset scenario may be set in the AI device before leaving factory, or a period of determining whether the scenario of the AI device is the preset scenario is set based on the user operation in the use process. Whether the current scenario is the preset scenario is periodically determined based on the preset period when the AI device is running.

Fourth: detecting whether a microphone of the AI device is in an on-state, and determining whether the current scenario of the AI device is the preset scenario if the microphone is in the on-state.

In the solution, whether to determine whether the current scenario of the AI device is the preset scenario is determined based on a microphone state. For example, if the AI device detects the microphone being in an on-state, then it may be considered that the user has a demand for voice interaction, thus determining whether the current scenario is the preset scenario is triggered. If the microphone is in an off-state, then it may be considered the user has no demand for voice interaction.

In addition to the above methods of triggering the AI device to determine whether the current scenario is the preset scenario, other methods or functions may be further provided to trigger the process, which is not limited in this solution.

On the basis of the above methods, for different scenarios, whether the current scenario of the AI device is the preset scenario needs to be detected using different methods, which is illustrated below with reference to examples.

For example: the preset scenarios include a calling scenario, then in the process of determining whether the current scenario of the AI device is a preset scenario, the AI device needs to detect whether it is in a calling process, or receives a request for calling, or in a process of dialing out a call. If it is in any one state, the current scenario of the AI device being the preset scenario may be determined.

The preset scenarios include a media file playing scenario, and then in the process of determining whether the current scenario of the AI device is a preset scenario, the AI device needs to detect whether it is playing an image, an audio file or a video file, such as playing a photo in a photo album, playing music, playing a voice message, broadcasting a notification message, or playing a video, online watching a video, or the like. If the AI device is determined to be playing a media file, then the current scenario of the AI device being the preset scenario may be determined.

The preset scenarios include a mobile scenario, and then in the process of determining whether the current scenario of the AI device is a preset scenario, the AI device needs to detect a moving speed and determine whether the moving speed of the AI device is greater than a preset value. For example, when the AI device is in a vehicle mounting state, the user must not manually execute some instructions. In this case, a specific moving speed threshold may be set, and when the speed is greater than the threshold, the AI device is determined to be in the mobile scenario, i.e., the current scenario is the preset scenario.

The preset scenarios include a messaging scenario, and then in the process of determining whether the current scenario of the AI device is a preset scenario, it is necessary to detect whether the AI device receives a short message or a notification message. For example, it receives a message sent by other user or receives a notification message sent by application software, then the current scenario of the AI device being the preset scenario may be determined.

The preset scenarios include an alarm clock scenario, then in the process of determining whether the current scenario of the AI device is a preset scenario, it is necessary to detect whether the alarm clock is in a reminder state. For example, if the time set by a user is reached, the AI device plays a ringtone or vibrates, then the current scenario of the AI device being the preset scenario is determined.

The preset scenarios include a photographing scenario, then in the process of determining whether the current scenario of the AI device is a preset scenario, the AI device needs to detect whether a photo is being taken, or a video is being recorded, or the like. If the photo is being taken, or the video is being recorded, then the current scenario of the AI device being the preset scenario is determined.

In a specific implementation of the solution, the preset scenarios are not limited to one preset scenario. One or more scenarios triggering the voice interaction process may be set in the AI device, which is not limited in this solution.

S102: wakening a voice interaction function of the AI device to facilitate voice interaction with a user, if the current scenario of the AI device is the preset scenario.

In this step, when the current scenario of the AI device being the preset scenario is determined according to any one of the above methods, a voice interaction function of the AI device may be directly waked to perform voice interaction with a user, collect and identify a content said by the user to determine and execute the instruction thereof.

The method for voice interaction according to the embodiment presets a preset scenario capable of triggering the voice interaction process in an AI device, the AI device determines whether the current scenario is the preset scenario In the use process, and wakens the voice interaction process if it determines that the current scenario is the preset scenario, i.e., directly triggering the voice interaction process by the scenario of the AI device, thereby avoiding the process of wakening by physical wakening or a wakening word, simplifying the process of using voice interaction, reducing the costs of learning voice interaction, improving user experience without the need of the process of wakening by special voice interaction hardware or a wakening word, and reducing the technology development costs.

Figure 4:
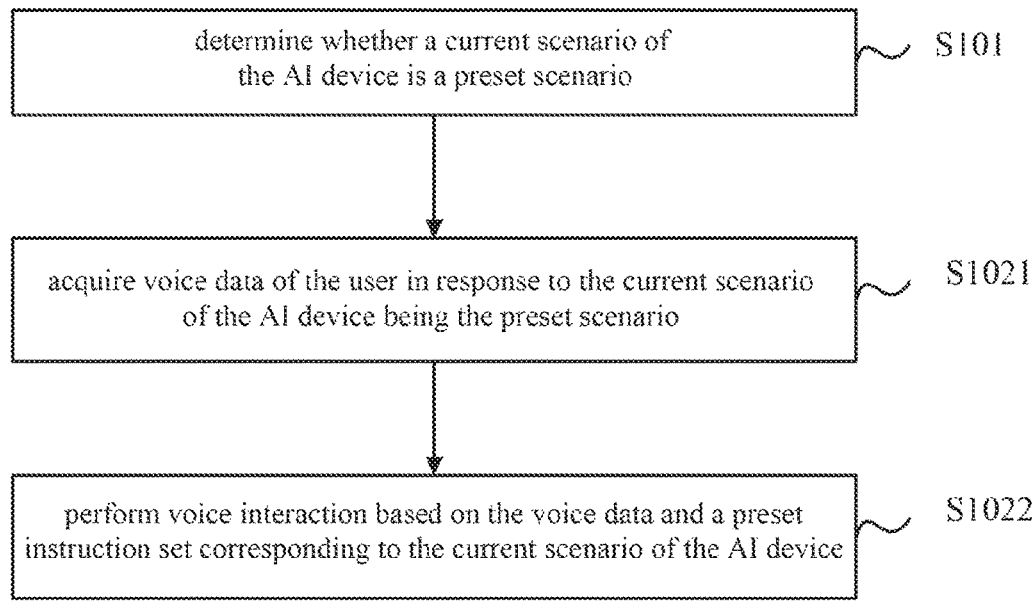
FIG. 4 is a flow chart of a method for voice interaction according to the second embodiment of the present disclosure.

FIG. 4 is a flow chart of a method for voice interaction according to a second embodiment of this disclosure. As shown in FIG. 4, on the basis of the first embodiment, a specific implementation of the wakening the voice interaction function of the AI device to facilitate voice interaction with a user if the current scenario of the AI device is the preset scenario in S102 may include:

S1021: acquiring voice data of the user if the current scenario of the AI device is the preset scenario.

In this step, it can be known that to waken the voice interaction function of the AI device to facilitate voice interaction with a user, it is first necessary to acquire the voice data of the user, i.e., it is necessary to collect a content said by the user. The specific implementation may be achieved at least by following methods:

first: controlling a microphone of the AI device to collect the voice data of the user.

If the microphone of the AI device is in an on-state, then the AI device may collect the content said by the user directly through the microphone to obtain the voice data; and if the microphone of the AI device is not turned on, the AI device controls the microphone to be turned on to collect the voice data of the user.

Second: controlling a bluetooth or a headset microphone connected to the AI device to collect a voice of the user and acquire the voice data of the user.

If the AI device is connected to a Bluetooth headset, a wireless headset or a wired headset, then the AI device may collect the content said by the user through the headset microphone to obtain the voice data of the user.

third, receiving the voice data of the user sent by other device.

If the AI device is connected to other wearable device, such as a smart watch or a smart bracelet, or is connected to other AI device, the voice data may also be collected by other AI devices and sent to the AI device, which is not limited in the solution.

S1022: performing voice interaction based on the voice data and a preset instruction set corresponding to the current scenario of the AI device.

In this step, after acquiring the voice data of the user, the AI device performs voice interaction based on the current scenario and the instruction set corresponding to the current scenario, which means that a corresponding instruction set is set for each preset scenario of the solution. When analyzing and identifying the voice data to determine to determine an operation set indicated by the user, it need to match the scenario with the instruction set corresponding to the scenario, to achieve accurate voice interaction.

Taking a mobile phone as an example below, different scenarios corresponding to different instruction sets are illustrated with reference to specific examples.

Calling scenario: In a calling scenario, operations that may be required by the user include hanging up the call, answering the call, ignoring the incoming call, hanging up the call and sending a message to the caller, sharing information in a calling process, and so on. Therefore, an instruction set corresponding to at least one of the operations may be set in the calling scenario. For example, in addition to simple instructions, such as hanging up, answering, and ignoring, in the calling process of the user, the caller needs to acquire contact information of a third-party user. Because it is not convenient to view the address book in the calling process, and it needs to say the contact information correctly for caller to record the contact information, which are complex. The user may say the demand "send the phone number of Mr. A to Mr. B". After triggering the voice interaction process in the calling scenario, the mobile phone calls the contact information of Mr. A and sends the contact information to the caller through a short message or network information based on the voice data of the user. In this case, an address book calling instruction and a short message sending instruction may be set in the instruction set, i.e., creating an instruction set corresponding to each scenario. Specific instruction types may be set based on the actual situation, which is not limited in this solution.

Media file playing scenario: For example, the mobile phone is playing music, operations that may be required by the user include: switch to last one, switch to next one, shuffle play, play, pause, fast forward, fast reverse, add to favorites, single cycle, playlist, volume up, volume down, mute, and so on. Therefore, an instruction set corresponding to at least one of the operations may be set in the music playing scenario.

A mobile phone is playing a video, and operations that may be required by the user include: brighten the screen, dim the screen, last episode, next episode, play, pause, fast forward, fast reverse, add to favorites, replay, playlist, volume up, volume down, mute, and so on. Therefore, an instruction set corresponding to at least one of the operations may be set in the video playing scenario.

A mobile phone is playing an image in an album in a form of slide, and operations that may be required by the user include: stop, last one, next one, exit, and so on. Therefore, an instruction set for implementing the operations may be set in the image playing scenario.

Alarm clock scenario: In the alarm clock scenario, operations that may be required by the user include: turn off, reminder in a few minutes, reminder next time, or the like. Therefore, an instruction set for implementing the operations may be set in the alarm scenario.

messaging scenario: when a mobile phone receives a notice or a short message, operations that may be required by the user include: broadcast the notice, broadcast the message, store the message, or delete the message. An instruction set corresponding to at least one of the operations may be set in the messaging scenario.

Photographing scenario: Taking the photographing scenario as an example, when a mobile phone starts a photographing mode, operations that may be required by the user include: photograph, say cheese, save the photo, discard, delete the photo, or the like. Therefore, an instruction set corresponding to at least one of the operations may be set in the photographing scenario.

Navigation scenario: When a mobile phone starts a navigation mode, operations that may be required by the user include: re-select route, change destination, terminate navigation, find a parking area closest to the destination, or the like. Likewise, an instruction set corresponding to at least one of the operations may be set in the navigation scenario.

Taking the above simple scenarios as an example, it can be known that voice interaction of the AI device in different scenarios has different goals, achieves different functions, and executes different operations.

Therefore, a different instruction set may be set for each preset scenario in specific implementations of the method for voice interaction, to facilitate accurately determining desired operations of the user based on the voice data of the user after the scenario triggers the voice interaction process, and executing the desired operations.

In the method for voice interaction according to this embodiment, a scenario of the AI device directly triggers the voice interaction process, thereby avoiding the process of wakening by physical wakening or a wakening word, simplifying the process of using voice interaction, reducing the costs of learning voice interaction, and improving user experience. At the same time, in different scenarios, different instruction sets are set. Different instructions are set for different scenarios, thereby more precisely achieving desired operations of users, and improving user experience.

Figure 5:
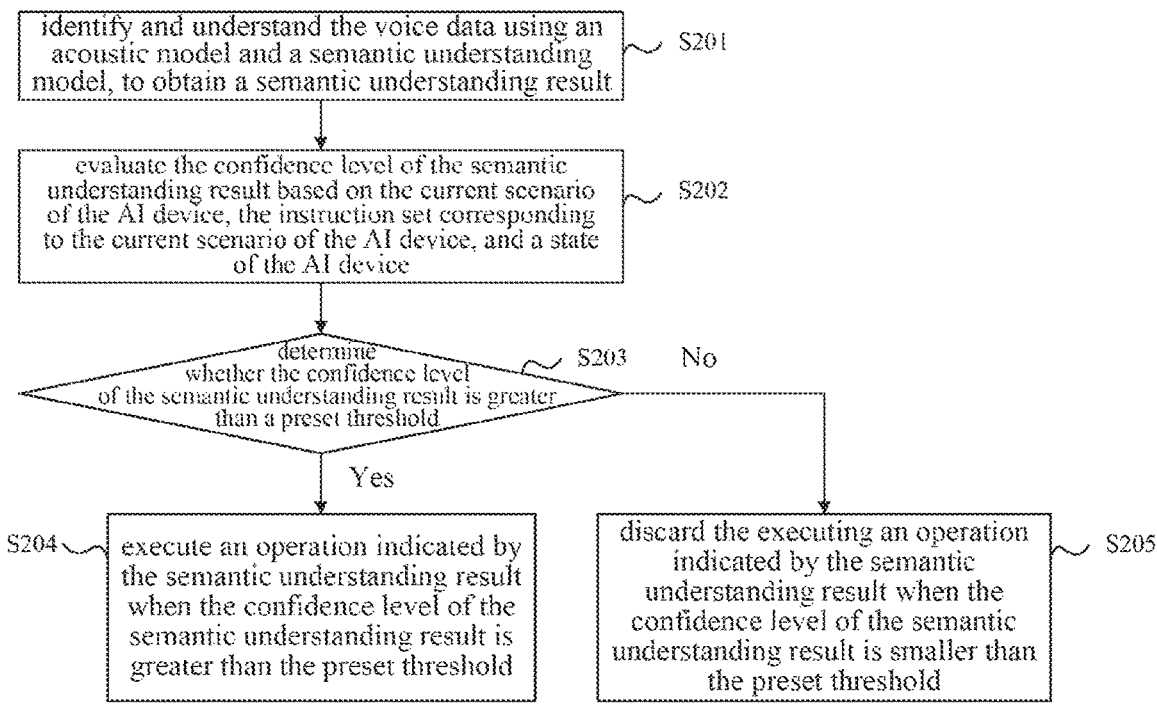
FIG. 5 is a flow chart of a method for voice interaction according to the third embodiment of the present disclosure.

FIG. 5 is a flow chart of a method for voice interaction according to the third embodiment of this disclosure. As shown in FIG. 5, on the basis of the above two embodiments, the current scenario of the AI device being the preset scenario triggers the voice interaction process. After acquiring the voice data, specific implementations of the voice interaction based on the voice data and a preset instruction set corresponding to the current scenario of the AI device include:

S201: identifying and understanding the voice data using an acoustic model and a semantic understanding model to obtain a semantic understanding result.

Before this step, it is first necessary to obtain language data based on a processing capacity, i.e., collecting training data of a considerable amount of scenarios and population groups. Collected data are annotated and processed to distinguish between intention types. Then acoustic model training is performed on the training data to form a constant acoustic model (also referred to as a voice identification model, or a voice identification model parameter) and a semantic understanding model (also referred to as a semantic understanding model parameter). In practical application, the AI device matches the voice data using the acoustic model, identifies the semantic data, and understands and analyzes the semantic data based on the semantic understanding model to obtain the semantic understanding result. Its meaning is to match the voice data using the acoustic model, identify the corresponding voice data, and if the corresponding voice data can be successfully identified, then analyze semantic of a user-entered sentence by comparing with the semantic understanding model, to obtain the semantic understanding result of the current sentence.

In a possible implementation, before the S201, the voice data may be processed by noise cancellation and echo cancellation. Specifically, if a built-in chip in the AI device supports noise cancellation and echo cancellation processing, the voice data will be first optimized. Even if a hardware device does not have noise cancellation and echo cancellation capabilities, after acquiring the voice data, a built-in noise cancellation algorithm and echo cancellation algorithm in a development tool (e.g., Duer SDK) will be used again to optimize the voice.

S202: evaluating the confidence level of the semantic understanding result based on the current scenario of the AI device, the instruction set corresponding to the current scenario of the AI device, and a state of the AI device.

In this step, the AI device is taken as an example. The AI device evaluates, based on the instruction set corresponding to the current scenario of the AI device and the current state of the AI device, the confidence level of the semantic understanding result obtained by the above understanding the voice data using the semantic understanding model i.e., evaluating the confidence level of the semantic understanding result. The semantic understanding result will include a plurality of dimensions, such as a sentence intention, an action word, and a proper noun. The calling scenario is taken as an example. For example, "ignore the phone" contains an action "ignore" and a proper noun "phone", and the whole sentence intention is to ignore the current incoming call of the device. In particular, when a user expression is a generalized expression, such as "ignore the incoming call", or "ignore answering the call", it is necessary to evaluate the accuracy in identifying corresponding intentions and operations based on the state of the AI device and the instruction set corresponding to the scenario, to obtain the confidence level of the semantic understanding result.

S203: determining whether the confidence level of the semantic understanding result is greater than the preset threshold.

In this step, the confidence level threshold may be preset in the AI device, i.e., determining a threshold of the accuracy of the semantic understanding result based on a plurality of simulation tests, that is, the threshold of the evaluated confidence level. After a user enters voice data, the semantic understanding result and the corresponding confidence level are obtained based on the above method, and then it is necessary to determine whether the confidence level is greater than the preset threshold.

S204: executing an operation indicated by the semantic understanding result when the confidence level of the semantic understanding result is greater than the preset threshold.

S205: discarding the executing an operation indicated by the semantic understanding result when the confidence level of the semantic understanding result is smaller than the preset threshold.

In the above two steps, i.e., the confidence level in the evaluation result being greater than the preset threshold is considered as successful semantic understanding, and an operation indicated by the semantic understanding result may be executed. In a specific implementation, the semantic understanding result may be outputted to a software interface for execution through a specified instruction, to facilitate the AI device to call appropriate software or hardware based on the instruction for execution. Otherwise, it is considered unsuccessful, and the obtained semantic understanding result is discarded, or voice data may be reacquired to repeat the above process.

In a specific implementation of the above solution, different from the user actively triggering the AI device to enter a voice acquisition state by operating a button, in the voice interaction solution according to some embodiments of this disclosure, once the AI device enters the preset scenario, the AI device will automatically enter the voice acquisition state, such as turning on mic calling (the operation is processed by a cooperative hardware manufacturer. SDK provides agreement requirements and definitions) to receive voice input from the user in real time, i.e., acquiring voice data. At the same time, the solution is different from a wakening button or a wakening word, and after wakening, only a single instruction (such as starting voice receiving) is provided to match only one application function of the AI device. In the semantic interaction process according to some embodiments of this disclosure, the voice interaction process of the AI device is deeply associated with the current scenario, the identified scenario and an instruction corresponding to the scenario need operations associated with hardware definitions (such as screen control, speaker control, or communication control of hardware). Accordingly, a full set of standardized hardware calling interface specifications is provided to help the hardware manufacturer to quickly control the AI device to implement desired operations.

In conclusion, the method for voice interaction according to embodiments of this disclosure has avoided the operation of wakening the AI device for voice acquisition, to enable users to use voice interaction by natural language expression. The method for voice interaction can favorably reduce the user's costs of learning voice interaction, and greatly helps to improve user experience and stickiness, whilst helping users to foster voice interaction habits, improving the frequency of using other scenarios and functions, simplifying the process of using voice interaction, reducing the costs of learning voice interaction, improving user experience, and reducing the technology development costs without the need of the process of wakening by special voice interaction wakening hardware or a wakening word.

Figure 6:
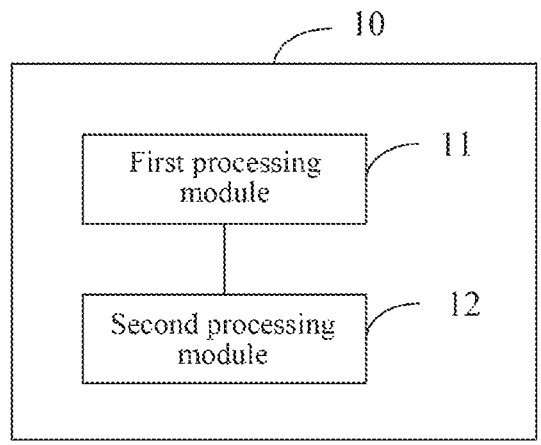
FIG. 6 is a structural schematic diagram of a an apparatus for voice interaction according to the first embodiment of the present disclosure.

FIG. 6 is a structural schematic diagram of an apparatus for voice interaction according to a first embodiment of this disclosure. As shown in FIG. 6, an apparatus 10 for voice interaction according to the embodiment includes:

a first processing module 11, for determining whether a current scenario of an apparatus for voice interaction is a preset scenario; and a second processing module 12, for wakening a voice interaction function of the apparatus for voice interaction to facilitate voice interaction with a user, if the current scenario of the apparatus for voice interaction is the preset scenario.

The apparatus for voice interaction according to the embodiment is used for implementing the technical solution of the embodiment of the method according to any one of the above embodiments of the method. Its implementation principle and technical effect are similar. A scenario directly triggers a voice interaction process, thereby avoiding the process of wakening by physical wakening or a wakening word, simplifying the process of using voice interaction, reducing the costs of learning voice interaction, and improving user experience.

In a specific implementation of the apparatus 10 for voice interaction, the first processing module 11 is specifically used for:

detecting whether the operation state of the apparatus for voice interaction is changed; and determining, if the operation state of the apparatus for voice interaction is changed, whether a scenario of the apparatus for voice interaction is the preset scenario after the operation state is changed.

Optionally, the first processing module 11 is specifically used for:

receiving a scenario setting instruction entered by a user on the apparatus for voice interaction; and determining whether the current scenario of the apparatus for voice interaction is the preset scenario based on the scenario setting instruction.

Optionally, the first processing module 11 is specifically used for:

periodically detecting and determining whether the current scenario of the apparatus for voice interaction is the preset scenario based on a preset period.

Optionally, the first processing module 11 is specifically used for:

detecting whether a microphone of the apparatus for voice interaction is in an on-state; and determining whether the current scenario of the apparatus for voice interaction is the preset scenario if the microphone is in the on-state.

Optionally, the preset scenario includes a calling scenario, and the first processing module 11 is further used for:

detecting whether the apparatus for voice interaction is in a calling process or receives a request for calling; and determining the current scenario of the apparatus for voice interaction is the preset scenario if the apparatus for voice interaction is in the calling process or receives the request for calling.

Optionally, the preset scenario includes a media file playing scenario, and the first processing module 11 is further used for:

detecting whether the apparatus for voice interaction is playing a media file, the media file including at least one of an image file, an audio file, or a video file; and determining the current scenario of the apparatus for voice interaction is the preset scenario if the apparatus for voice interaction is playing the media file.

Optionally, the preset scenario includes a mobile scenario, and the first processing module 11 is further used for:

detecting a moving speed of the apparatus for voice interaction, and determining whether the moving is greater than a preset value; and determining the current scenario of the apparatus for voice interaction is the preset scenario if the moving is greater than the preset value.

Optionally, the preset scenario includes an information scenario, and the first processing module 11 is further used for:

detecting whether the apparatus for voice interaction receives a short message or a notification message; and determining the current scenario of the apparatus for voice interaction is the preset scenario if the apparatus for voice interaction receives the short message or the notification message.

Optionally, the second processing module 12 is specifically used for:

acquiring voice data of the user; and performing voice interaction based on the voice data and a preset instruction set corresponding to the current scenario of the apparatus for voice interaction.

Optionally, the second processing module 12 is further used for:

controlling the microphone of the apparatus for voice interaction to collect the voice data of the user;

or, controlling a bluetooth or a headset microphone connected to the apparatus for voice interaction to collect a voice of the user and acquire the voice data of the user;

or, receiving the voice data of the user sent by other device.

The apparatus for voice interaction according to the above implementations is used for implementing the technical solution of any one of the above embodiments of the method. Its implementation principle and technical effect are similar, and are not repeated any more here.

Figure 7:
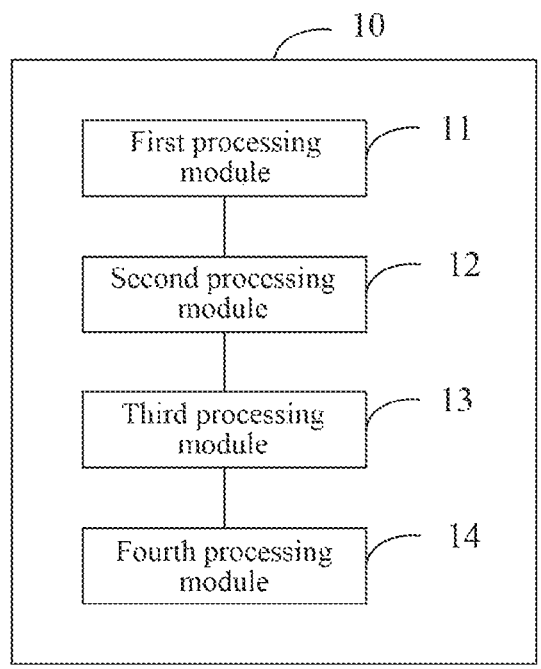
FIG. 7 is a structural schematic diagram of an apparatus for voice interaction according to the second embodiment of the present disclosure.

FIG. 7 is a structural schematic diagram of a second embodiment of an apparatus for voice interaction according to an embodiment of the disclosure. As shown in FIG. 7, the apparatus 10 for voice interaction includes:

a third processing module 13, for identifying and understanding the voice data using an acoustic model and a semantic understanding model to obtain a semantic understanding result; and a fourth processing module 14, for executing an operation indicated by the semantic understanding result when a confidence level of the semantic understanding result is greater than a preset threshold.

In a specific implementation, before the identifying and understanding the voice data using an acoustic model and a semantic understanding model, the third processing module 13 is further used for processing the voice data by noise cancellation and echo cancellation.

Optionally, the third processing module 13 is specifically used for:

matching the voice data using the acoustic model to identify semantic data; and understanding and analyzing the semantic data based on the semantic understanding model to obtain the semantic understanding result.

Optionally, the fourth processing module 14 is specifically used for:

evaluating the confidence level of the semantic understanding result based on the current scenario of the apparatus for voice interaction, the instruction set corresponding to the current scenario of the apparatus for voice interaction, and a state of the apparatus for voice interaction;

determining whether the confidence level of the semantic understanding result is greater than the preset threshold; and discarding the executing an operation indicated by the semantic understanding result when the confidence level of the semantic understanding result is smaller than the preset threshold.

Optionally, the fourth processing module 14 is further used for:

outputting the semantic understanding result to a software interface for execution through a specified instruction.

The apparatus for voice interaction according to the above implementations is used for implementing the technical solution of any one of the above embodiments of the method. Its implementation principle and technical effect are similar, and are not repeated any more here.

Some embodiments of this disclosure further provides an AI device, including: a memory and a processor; where the number of the processors is at least one.

The memory is used for storing computer instructions; and the processor is used for running the computer instructions stored in the memory to implement the method for voice interaction according to any one of the above embodiments of the method.

Some embodiments of this disclosure further provides a storage medium, including: a readable storage medium and computer instructions, where the computer instructions are stored in the readable storage medium; and the computer instructions are used for implementing the method for voice interaction according to any one of the above embodiments of the method.

Embodiments of this disclosure further provide a program product. The program product includes computer instructions (i.e., computer programs). The computer instructions are stored in a readable storage medium. At least one processor of the AI device can read the computer instructions from the readable storage medium, and at least one processor executes the computer instructions to enable the AI device to implement the method for voice interaction according to any one of the above embodiments.

In a specific implementation of the AI device, it will be appreciated that the processor may be a central processing unit (CPU for short), or other universal processor, digital signal processor (DSP for short), application specific integrated circuit (ASIC for short), or the like. The universal processor may be a microprocessor, or the processor may be any conventional processor. The steps in conjunction with the method disclosed by the embodiments of this disclosure may be directly reflected in executions completed by hardware processors or by combination of hardware and software modules in the processor.

As will be appreciated by those skilled in the art, all or parts of the steps to achieve the above embodiments of the method can be completed by hardware associated with the program instructions. The above programs may be stored in a computer-readable storage medium. The programs execute, when executed, steps including the above embodiments of the method; and the above storage medium includes: a read-only memory (ROM for short), a RAM, a flash memory, a hard disk, a solid-state disk, a magnetic tape, a floppy disk, an optical disk, and any combination thereof.

Finally, it should be noted that: the above embodiments are only presented to illustrate the technical solutions of the disclosure, rather than limit them. The disclosure is described in detail with reference to the preceding embodiments, those skilled in the art shall understand that: the technical solutions disclosed in the preceding embodiments may be modified, parts or all of the technical characteristics thereof may be equivalently replaced; and these modifications or replacements do not cause the essence of corresponding technical solutions to depart from the scope of the technical solutions according to the embodiments of the disclosure.

What is claimed is:

1. A method for voice interaction, applied to an artificial intelligence (AI) device, and comprising:

determining whether a current scenario of the AI device is a preset scenario;

wakening a voice interaction function of the AI device to facilitate voice interaction with a user, in response to the current scenario of the AI device being the preset scenario, wherein the wakening a voice interaction function of the AI device to facilitate voice interaction with a user comprises:

acquiring voice data of the user;

identifying and understanding the voice data using an acoustic model and a semantic understanding model to obtain a semantic understanding result; and executing an operation indicated by the semantic understanding result when a confidence level of the semantic understanding result is greater than a preset threshold, and wherein the method is performed by at least one processor.

2. The method according to claim 1, wherein the determining whether a current scenario of the AI device is a preset scenario comprises:

detecting whether an operation state of the AI device is changed; and determining, in response to the operation state of the AI device being changed, whether a scenario of the AI device is the preset scenario after the operation state is changed;

or, receiving a scenario setting instruction entered by a user on the AI device; and determining whether the current scenario of the AI device is the preset scenario based on the scenario setting instruction;

or, periodically detecting and determining whether the current scenario of the AI device is the preset scenario based on a preset period;

or, detecting whether a microphone of the AI device is in an on-state; and determining whether the current scenario of the AI device is the preset scenario in response to the microphone being in the on-state.

3. The method according to claim 1, wherein the preset scenario comprises a calling scenario, and the determining whether a current scenario of the AI device is a preset scenario comprises:

detecting whether the AI device is in a calling process or receives a request for calling; and determining the current scenario of the AI device is the preset scenario in response to the AI device being in the calling process or receiving the request for calling;

or, the preset scenario comprises a media file playing scenario, and the determining whether a current scenario of the AI device is a preset scenario comprises:

detecting whether the AI device is playing a media file, the media file comprising at least one of an image file, an audio file, or a video file; and determining the current scenario of the AI device is the preset scenario in response to the AI device being playing the media file;

or, the preset scenario comprises a mobile scenario, and the determining whether a current scenario of the AI device is a preset scenario comprises:

detecting a moving speed of the AI device, and determining whether the moving speed is greater than a preset value; and determining the current scenario of the AI device is the preset scenario in response to the moving speed being greater than the preset value;

or, the preset scenario comprises a messaging scenario, and the determining whether a current scenario of the AI device is a preset scenario comprises:

detecting whether the AI device receives a short message or a notification message; and determining the current scenario of the AI device is the preset scenario in response to the AI device receiving the short message or the notification message.

4. The method according to claim 1, wherein the wakening a voice interaction function of the AI device to facilitate voice interaction with a user comprises:

performing voice interaction based on the voice data and a preset instruction set corresponding to the current scenario of the AI device.

5. The method according to claim 1, wherein the acquiring voice data of the user comprises:

controlling the microphone of the AI device to collect the voice data of the user;

or, controlling a Bluetooth or a headset microphone connected to the AI device to collect a voice of the user and acquire the voice data of the user;

or, receiving the voice data of the user sent by an other device.

6. The method according to claim 1, wherein before the identifying and understanding the voice data using an acoustic model and a semantic understanding model, the method further comprises:

processing the voice data by noise cancellation and echo cancellation.

7. The method according to claim 1, wherein the identifying and understanding the voice data using an acoustic model and a semantic understanding model to obtain a semantic understanding result comprises:

matching the voice data using the acoustic model to identify semantic data; and understanding and analyzing the semantic data based on the semantic understanding model to obtain the semantic understanding result.

8. The method according to claim 1, further comprising:

evaluating the confidence level of the semantic understanding result based on the current scenario of the AI device, the instruction set corresponding to the current scenario of the AI device, and a state of the AI device;

determining whether the confidence level of the semantic understanding result is greater than the preset threshold; and discarding the executing an operation indicated by the semantic understanding result in response to determining that the confidence level of the semantic understanding result is smaller than the preset threshold.

9. The method according to claim 1, wherein the executing the operation indicated by the semantic understanding result comprises:

outputting the semantic understanding result to a software interface for execution through a specified instruction.

10. An apparatus for voice interaction, comprising:

at least one processor; and a memory storing instructions, the instructions when executed by the at least one processor, cause the at least one processor to perform operations, the operations comprising:

determining whether a current scenario of an apparatus for voice interaction is a preset scenario; and wakening a voice interaction function of the apparatus for voice interaction to facilitate voice interaction with a user, in response to the current scenario of the apparatus for voice interaction being the preset scenario, wherein the wakening a voice interaction function of the AI device to facilitate voice interaction with a user comprises:

acquiring voice data of the user;

identifying and understanding the voice data using an acoustic model and a semantic understanding model to obtain a semantic understanding result; and executing an operation indicated by the semantic understanding result when a confidence level of the semantic understanding result is greater than a preset threshold.

11. The apparatus according to claim 10, wherein the determining whether a current scenario of the AI device is a preset scenario comprises:

detecting whether an operation state of the apparatus for voice interaction is changed; and determining, in response to the operation state of the apparatus for voice interaction being changed, whether a scenario of the apparatus for voice interaction is the preset scenario after the operation state is changed;

or, receiving a scenario setting instruction entered by a user on the apparatus for voice interaction; and determining whether the current scenario of the apparatus for voice interaction is the preset scenario based on the scenario setting instruction;

or, periodically detecting and determining whether the current scenario of the apparatus for voice interaction is the preset scenario based on a preset period;

or, detecting whether a microphone of the apparatus for voice interaction is in an on-state; and determining whether the current scenario of the apparatus for voice interaction is the preset scenario in response to the microphone being in the on-state.

12. The apparatus according to claim 10, wherein the preset scenario comprises a calling scenario, and the first processing module is further used for:

detecting whether the apparatus for voice interaction is in a calling process or receives a request for calling; and determining the current scenario of the apparatus for voice interaction is the preset scenario in response to the apparatus for voice interaction being in the calling process or receiving the request for calling;

or, the preset scenario comprises a media file playing scenario, and the first processing module is further used for:

detecting whether the apparatus for voice interaction is playing a media file, the media file comprising at least one of an image file, an audio file, or a video file; and determining the current scenario of the apparatus for voice interaction is the preset scenario in response to the apparatus for voice interaction being playing the media file;

or, the preset scenario comprises a mobile scenario, and the first processing module is further used for:

detecting a moving speed of the apparatus for voice interaction, and determining whether the moving speed is greater than a preset value; and determining the current scenario of the apparatus for voice interaction is the preset scenario in response to the moving speed being greater than the preset value;

or, the preset scenario comprises a messaging scenario, and the first processing module is further used for:

detecting whether the apparatus for voice interaction receives a short message or a notification message; and determining the current scenario of the apparatus for voice interaction is the preset scenario in response to the apparatus for voice interaction receiving the short message or the notification message.

13. The apparatus according to claim 10, wherein the wakening a voice interaction function of the AI device to facilitate voice interaction with a user comprises:

performing voice interaction based on the voice data and a preset instruction set corresponding to the current scenario of the apparatus for voice interaction.

14. The apparatus according to claim 10, wherein the acquiring voice data of the user comprises:

controlling the microphone of the apparatus for voice interaction to collect the voice data of the user;

or, controlling a Bluetooth or a headset microphone connected to the apparatus for voice interaction to collect a voice of the user and acquire the voice data of the user;

or, receiving the voice data of the user sent by an other device.

15. The apparatus according to 10, wherein before the identifying and understanding the voice data using an acoustic model and a semantic understanding model, the operations further comprises:

processing the voice data by noise cancellation and echo cancellation.

16. The apparatus according to claim 10, wherein the identifying and understanding the voice data using an acoustic model and a semantic understanding model to obtain a semantic understanding result comprises:

matching the voice data using the acoustic model to identify semantic data; and understanding and analyzing the semantic data based on the semantic understanding model to obtain the semantic understanding result.

17. The apparatus according to claim 10, wherein the operation further comprises:

evaluating the confidence level of the semantic understanding result based on the current scenario of the apparatus for voice interaction, the instruction set corresponding to the current scenario of the apparatus for voice interaction, and a state of the apparatus for voice interaction;

determining whether the confidence level of the semantic understanding result is greater than the preset threshold; and discarding the executing an operation indicated by the semantic understanding result in response to determining that the confidence level of the semantic understanding result is smaller than the preset threshold.

18. A non-transitory computer readable storage medium storing a computer program, wherein the computer program, when executed by a processor, cause the processor to perform operations, the operation comprising:

determining whether a current scenario of the AI device is a preset scenario; and wakening a voice interaction function of the AI device to facilitate voice interaction with a user, in response to the current scenario of the AI device being the preset scenario, wherein the wakening a voice interaction function of the AI device to facilitate voice interaction with a user comprises:

acquiring voice data of the user;

identifying and understanding the voice data using an acoustic model and a semantic understanding model to obtain a semantic understanding result; and executing an operation indicated by the semantic understanding result when a confidence level of the semantic understanding result is greater than a preset threshold.

* * * * *